Jan. 13, 1970  C. E. BONIFACE  3,488,829

PLUGGING OF DEFECTIVE TUBES IN TUBE BUNDLES

Filed Nov. 28, 1967

United States Patent Office 3,488,829
Patented Jan. 13, 1970

3,488,829
PLUGGING OF DEFECTIVE TUBES IN
TUBE BUNDLES
Colin Ernest Boniface, Haywards Heath, England, assignor to Foster Wheeler Corporation, Livingston, N.J., a corporation of New York
Filed Nov. 28, 1967, Ser. No. 686,205
Claims priority, application Great Britain, Nov. 28, 1966, 53,240/66
Int. Cl. F16f 1/34
U.S. Cl. 29—474.3     12 Claims

ABSTRACT OF THE DISCLOSURE

A defective tube in a heat exchanger is plugged by welding a plug in it or the header to which it is connected. A tapered plug having a head thick enough to withstand the differential pressure across it during use and an annular skirt integral with the head inserted into the tube or header and welded to the side wall of the tube or to the header.

BACKGROUND OF THE INVENTION

This invention describes the stopping of defective tubes in tube and shell heat exchangers. Plugs are tightly fitted into each end of the defective tube from the side of the tube plate or header remote from that from which the tube extends, and then these plugs are permanently sealed in place by means of an internal circumferential weld made between the plug and the wall of the tube.

These tube and shell heat exchangers generally comprise a bundle of very closely spaced tubes extending between headers or tube plates and positioned within a pressure shell so as substantially completely to fill the shell. It will be realised that if one of the tubes fails it is not possible to obtain access to it and replace it.

Often, therefore, these heat exchangers are designed to have a heat exchanging surface slightly in excess of the minimum design requirements and then if a tube fails it can be blocked off by inserting plugs into the ends of the tube by obtaining access from the headers or tube plates to which it is attached. Satisfactory tube stopping can be achieved in this manner, but there is always the possibility that a plug can work loose and lead to a leakage and mixing of the fluids in heat exchange.

This problem of leakage and also that of access are of course substantially magnified in the case where one of the fluids in heat exchange is radio-active.

The invention has been made with this problem in mind, and according to the invention the ends of a defective tube are stopped with plugs inserted either into the ends of the tube or into the holes in the headers or tube plates to which the tube is connected and then the plugs are positively sealed in place by means of an internal bore weld run between the inserted plug and the tube or tube plate.

The weld can, for example, be made with an internal welding torch of the types shown in British Patent Nos. 913,207 and 934,485, and in order to reach the plug from outside the pressure shell, the torch can be mounted on the end of a boom and be remotely controlled from outside the shell.

According to another aspect of the invention there is provided a metallic plug for use in plugging these defective tubes, which plug comprises a head of sufficient thickness to withstand the differential pressure across it during use, and an annular skirt integral with the head, which defines a cylindrical recess into which the head of the torch can extend during welding and which is sufficiently thin to enable it to be fused to the wall of the tube, header or tube plate. Preferably the outside of the plug is tapered in the direction from the skirt to the head so that the head will readily fit within the tube or hole and then a tight fit is provided by forcing the skirt into the tube or hole with, for example, a remotely controlled pneumatic hammer.

The invention has particular application to the plugging of small bore tubes, that is to say, tubes having a maximum outside diameter of about 1½ inches.

DESCRIPTION OF THE DRAWINGS

The invention will now be described, by way of example, with reference to the accompanying diagrammatic drawings, in which.

DESCRIPTION OF THE PREFERRED EMBODIMENT

Figure 1:
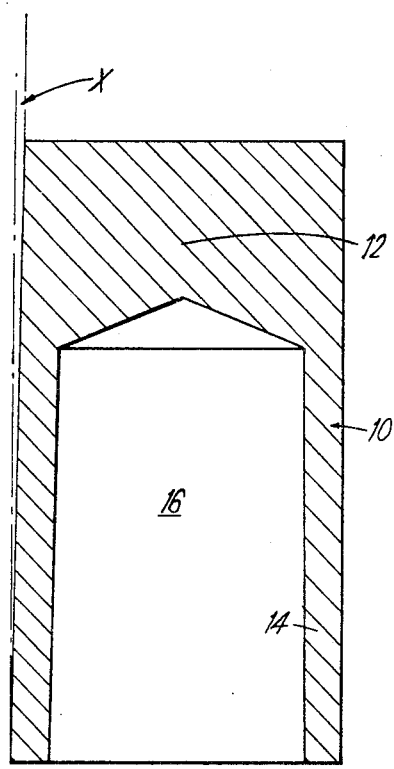
FIGURE 1 is a cross section of a plug.
Figure 2:
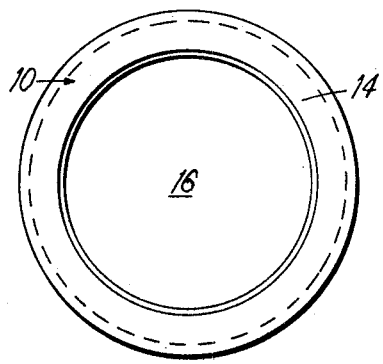
FIGURE 2 is an end view of the plug in the direction of the arrow 2 of FIGURE 1.

The metal plug 10 shown in FIGURES 1 and 2 has a head 12 and an integral annular skirt 14 which defines a cylindrical recess 16. The plug can be made from a metal of similar nature to the material of the tube, tube plate or header into which it is to be inserted. For example, the plug can be made from stainless steel.

The outside of the plug tapers very slightly from the skirt to the head. As shown in FIGURE 1 this taper can, for example, be such that the angle $x$ is ½°. The taper is provided so that the head can easily be fitted within a tube to be plugged and then the plug can be forced home within the hole to give a tight and secure fit, for example using a pneumatic hammer.

Figure 3:
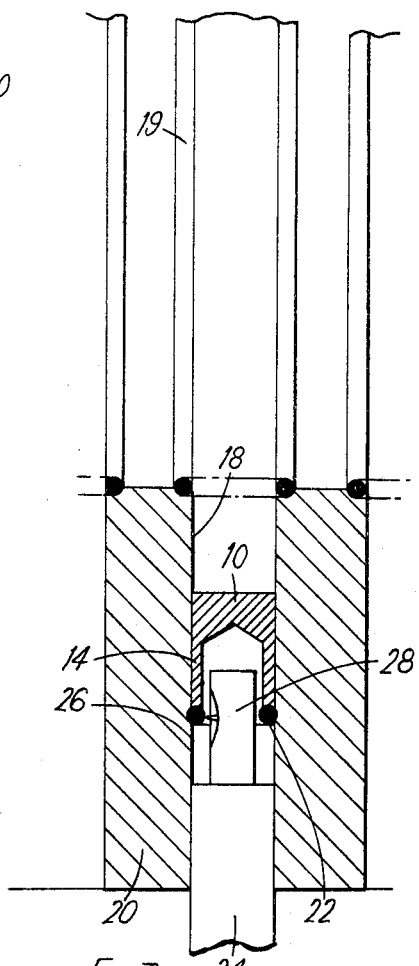
FIGURE 3 shows the welding of the plug in a header or tube plate to seal-off a defective tube.

As shown in FIGURE 3 once the plug has been forced into the hole to give a tight fit, it is positively sealed within in the hole 26 in the tube plate 20 communicating with the defective tube 19 by lap welding the skirt 14 to the wall of the hole by an internal bore weld 22 effected by a torch 24. As will be seen from the drawing, the head 28 of the torch fits within the recess 16 and the skirt 14 is sufficiently thin to fuse and form the weld 22.

Once the plug has been positively sealed in place in this manner the risk of its being dislodged during further use of the heat exchanger is eliminated, and in the case of heat exchangers where one of the fluids is radio-active, this is a very important factor.

Suitable dimensions of a plug for plugging a tube having an internal diameter of 0.389 inch, are for example, a maximum outside diameter of 0.398″ tapering to 0.396″ at the head 12 of the plug, an inside diameter of 0.3125″ for the recess 16 so that the thickness of the skirt 14 is about 0.043″, an overall length of about 0.75″, and a depth of about 0.5″ for the recess 16.

The preferred dimensions of the plug in relation to the diameter of the hole to be plugged are given by the relationships:

$$OD = ID + 0.007″$$
$$L = 2 \times OD$$
$$D = \tfrac{3}{4} L$$

where L is the overall length of the plug, OD the maximum outside diameter, ID is the internal diameter of the hole to be plugged and D is the maximum length of the recess 16.

In the heat exchanger part of which is shown in FIGURE 3, the tubes terminate at the surface of the tube plate 20 and there they are welded to the tube plate. In other cases the tubes may extend partially into or completely through the holes 18 in the tube plate and in this ase, the plug 10 may be inserted into, and welded to, the tube itself, instead of into the hole 18 through the tube plate as shown in FIGURE 3. Therefore as used in this specification and claims the channel is intended to cover both the hole 18 through the tube plate as well as the hole extending longitudinally through the tube.

Also, as used herein we intend the term "tube plate" to include both tube plates and headers.

Although we have described the invention in connection with heat exchangers where the formation of a positive seal is vital, the invention is also applicable to the plugging of defective tubes in other heat exchangers or condensers, or in other apparatus employing closely spaced bundles of tubes.

I claim:

1. A method of stopping a defective tube in a tube and shell heat exchanger which includes a bundle of tubes and a pair of tube plates between which the tubes extend, comprising the steps of:

forcibly inserting a plug into each end of the defective tube from the side of the tube plate remote from that from which said tubes extend, and positively sealing said plugs in place by means of a circumferential weld effected from within the ends of the defective tube between said plugs and from within the wall of the defective tube.

2. A method according to claim 1 in which said plugs are forced into the ends of the defective tube by means of a pneumatic hammer.

3. A plug of fusible metal for use in plugging a channel comprising:

(a) a substantially cylindrical head of sufficient thickness to withstand differential pressure likely to be encountered across it;

(b) an integral annular skirt extending from said head, said skirt being sufficiently thin to be fused at the end thereof remote from said plug during the making of a circumferential weld by an internal welding torch; and (c) a cylindrical recess defined by said skirt in which the head of an internal tube welding torch can project during the making of said circumferential weld.

4. A plug according to claim 3 which has a slight taper from said head to said skirt so as to assist in its insertion into the end of a defective tube.

5. A plug according to claim 3 which has dimensions which substantially satisfy the relationship:

$$L = 2 \times OD$$
$$D = \tfrac{3}{4} L$$

where L is the overall length of said plug, OD is the maximum outside diameter of said plug, and D is the maximum length of said cylindrical recess defined by said skirt.

6. A method of stopping a defective tube in a tube and shell heat exchanger which includes a bundle of closely spaced tubes, a pair of tube plates or headers between which said tubes extend, in alignment with holes in said tube plates or headers and a shell surrounding said tubes and tube plates or headers, comprising the steps of:

(a) locating a defective tube, (b) forcibly inserting a tightly fitting plug into the holes in said tube plates or headers which are in alignment with said defective tube, from the sides of the tube plates or header remote from the tubes, and (c) welding said plugs in place by means of an internal circumferential weld, effected from within said holes, between the said plug and the wall defining said hole.

7. A method according to claim 6 further comprising the step of providing a plug having a maximum outside diameter which is 0.007" larger than the internal diameter of said holes through said plates or headers.

8. The method of plugging a channel comprising the steps of:

providing a plug having a head and an annular skirt extending from said head;

inserting said plug into said channel so that said head goes in first;

inserting a welder into said channel; and, welding by means of said welder the end edge of said skirt remote from said head to the inside wall of said channel.

9. The method defined in claim 8 wherein said welder is inserted into the recess defined by said skirt.

10. The method of plugging a channel comprising the steps of:

providing a plug having a head and an integral skirt extending from said head, forcing said plug into said channel in an axial direction so that said plug is tightly held in said channel with the end edge of said skirt contiguous to the side wall of said channel;

welding said plug to the side wall of said channel at the end edge of said skirt remote from said head.

11. The method defined in claim 10 wherein the welding step is performed by fusing edge of said skirt at the end of said skirt remote from said head to the side wall of said channel.

12. The method defined in claim 11 wherein the welding step is performed by using a torch welder.

References Cited

UNITED STATES PATENTS

| | | | |
|---|---|---|---|
| 2,394,831 | 2/1946 | Woods | 165—76 |
| 3,247,591 | 4/1966 | Panseri | 29—474.3 |

ROBERT A. O'LEARY, Primary Examiner

C. SUKALO, Assistant Examiner

U.S. Cl. X.R.

165—71, 76